US010767059B2

(12) United States Patent
Poteet et al.

(10) Patent No.: US 10,767,059 B2
(45) Date of Patent: Sep. 8, 2020

(54) HIGH TEMPERATURE OXIDATION PROTECTION FOR COMPOSITES (71) Applicant: Goodrich Corporation, Charlotte, NC (US)

(72) Inventors: Steven A. Poteet, Hamden, CT (US); Gavin Charles Richards, Windsor, CT (US); Zachary Cohen, West Hartford, CT (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 15/234,903

(22) Filed: Aug. 11, 2016

(65) Prior Publication Data
US 2018/0044537 A1    Feb. 15, 2018

(51) Int. Cl.
C09D 5/08 (2006.01)
C04B 41/52 (2006.01)
C04B 41/00 (2006.01)
C03C 1/00 (2006.01)
C23C 18/12 (2006.01)
C04B 41/89 (2006.01)
F16D 69/02 (2006.01)
B05D 1/02 (2006.01)
B05D 1/28 (2006.01)
C03C 8/16 (2006.01)
C03C 14/00 (2006.01)
C04B 41/45 (2006.01)
C04B 41/50 (2006.01)
C04B 41/85 (2006.01)
C04B 111/00 (2006.01)
B64C 25/34 (2006.01)
B64C 25/42 (2006.01)

(52) U.S. Cl.
CPC .............. C09D 5/084 (2013.01); B05D 1/02 (2013.01); B05D 1/28 (2013.01); C03C 1/008 (2013.01); C03C 8/16 (2013.01); C03C 14/004 (2013.01); C04B 41/009 (2013.01); C04B 41/4537 (2013.01); C04B 41/5023 (2013.01); C04B 41/52 (2013.01); C04B 41/524 (2013.01); C04B 41/85 (2013.01); C04B 41/89 (2013.01); C23C 18/1216 (2013.01); C23C 18/1254 (2013.01); F16D 69/023 (2013.01); B64C 25/34 (2013.01); B64C 25/42 (2013.01); C03C 2203/26 (2013.01); C03C 2203/30 (2013.01); C03C 2205/00 (2013.01); C04B 2111/00362 (2013.01); C04B 2235/422 (2013.01); F16D 2250/0046 (2013.01)

(58) Field of Classification Search
CPC .................. C09D 5/084; B05D 1/02
USPC ..................................................... 427/376.1
See application file for complete search history.

(56) References Cited

U.S. PATENT DOCUMENTS

| | | |
|---|---|---|
| 2,685,539 A | 8/1954 | Woodburn, Jr. et al. |
| 2,685,540 A | 8/1954 | Woodburn, Jr. et al. |
| 2,685,541 A | 8/1954 | Woodburn, Jr. et al. |
| 2,685,542 A | 8/1954 | Woodburn, Jr. et al. |
| 2,989,153 A | 6/1961 | Boulet et al. |
| 3,342,627 A | 9/1967 | Paxton et al. |
| 3,510,347 A | 5/1970 | Strater |
| 3,692,150 A | 9/1972 | Ruppe, Jr. |
| 3,713,882 A | 1/1973 | DeBrunner et al. |
| 3,794,509 A | 2/1974 | Trauger et al. |
| 3,972,395 A | 8/1976 | Jannasch et al. |
| 4,290,510 A | 9/1981 | Warren |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,471,023 A | 9/1984 | Shuford |
| 4,500,602 A | 2/1985 | Patten et al. |
| 4,548,957 A | 10/1985 | Hucke |
| 4,617,232 A | 10/1986 | Chandler et al. |
| 4,621,017 A | 11/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,837,073 A * | 6/1989 | McAllister ............ C04B 41/009 427/343 |
| 4,863,001 A | 9/1989 | Edmisten |

(Continued)

FOREIGN PATENT DOCUMENTS

| | | |
|---|---|---|
| CN | 1046517 | 10/1990 |
| CN | 102515850 | 6/2012 |

(Continued)

OTHER PUBLICATIONS

Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).*
Extended European Search Report dated Aug. 2, 2017 in European Application No. 17159538.2.
D.D.L. Chung: "Acid Aluminum Phosphate for the Binding and Coating of Materials", Journal of Materials Science, vol. 38, No. 13, 2003, pp. 2785-2791.
Extended European Search Report dated Jul. 26, 2016 in European Application No. 16161832.7.
International Search Report and Written Opinion dated Apr. 20, 2005 in Application No. PCT/US2004/012222.

(Continued)

Primary Examiner — Tabatha L Penny
(74) Attorney, Agent, or Firm — Snell & Wilmer, L.L.P.

(57) ABSTRACT

A method for coating a composite structure, comprising applying a first slurry onto a surface of the composite structure, wherein the first slurry is a sol gel comprising a metal organic salt, a first carrier fluid, and a ceramic material, and heating the composite structure to a first sol gel temperature sufficient to form a sol gel-derived base layer on the composite structure.

11 Claims, 6 Drawing Sheets

(56) References Cited

U.S. PATENT DOCUMENTS

| | | | |
|---|---|---|---|
| 4,892,790 A | 1/1990 | Gray | |
| 4,958,998 A | 9/1990 | Yamauchi et al. | |
| 5,073,454 A | 12/1991 | Graham | |
| 5,077,130 A | 12/1991 | Okuyama et al. | |
| 5,094,901 A | 3/1992 | Gray | |
| 5,102,698 A | 4/1992 | Cavalier et al. | |
| 5,153,070 A | 10/1992 | Andrus et al. | |
| 5,198,152 A | 3/1993 | Liimatta et al. | |
| 5,215,563 A | 6/1993 | LaCourse et al. | |
| 5,224,572 A | 7/1993 | Smolen et al. | |
| 5,242,746 A | 9/1993 | Bommier et al. | |
| 5,256,448 A * | 10/1993 | De Castro | C04B 41/009 423/345 |
| 5,273,819 A | 12/1993 | Jex | |
| 5,298,311 A | 3/1994 | Bentson et al. | |
| 5,324,541 A | 6/1994 | Shuford | |
| 5,401,440 A | 3/1995 | Stover et al. | |
| 5,427,823 A | 6/1995 | Varshney et al. | |
| 5,439,080 A | 8/1995 | Haneda et al. | |
| 5,501,306 A | 3/1996 | Martino | |
| 5,518,683 A | 5/1996 | Taylor et al. | |
| 5,518,816 A | 5/1996 | Shuford | |
| 5,536,574 A | 7/1996 | Carter | |
| 5,622,751 A | 4/1997 | Thebault et al. | |
| 5,629,101 A | 5/1997 | Watremez | |
| 5,643,663 A | 7/1997 | Bommier et al. | |
| 5,682,596 A | 10/1997 | Taylor et al. | |
| 5,686,144 A | 11/1997 | Thebault et al. | |
| 5,714,244 A | 2/1998 | Delaval et al. | |
| 5,725,955 A | 3/1998 | Tawil et al. | |
| 5,759,622 A | 6/1998 | Stover | |
| 5,871,820 A | 2/1999 | Hasz et al. | |
| 5,878,843 A | 3/1999 | Saum | |
| 5,878,849 A | 3/1999 | Prunier, Jr. et al. | |
| 5,901,818 A | 5/1999 | Martino | |
| 5,958,846 A | 9/1999 | Geriner | |
| 5,971,113 A | 10/1999 | Kesavan et al. | |
| 5,981,072 A | 11/1999 | Mercuri et al. | |
| 6,016,450 A | 1/2000 | Corck | |
| 6,071,603 A | 6/2000 | Sakai et al. | |
| 6,331,362 B1 | 12/2001 | Dupel et al. | |
| 6,346,331 B2 | 2/2002 | Harvey et al. | |
| 6,460,374 B2 | 10/2002 | Sakai et al. | |
| 6,461,415 B1 | 10/2002 | Sambasivan et al. | |
| 6,497,307 B1 | 12/2002 | Schoo et al. | |
| 6,551,701 B1 | 4/2003 | Nohr et al. | |
| 6,551,709 B1 | 4/2003 | Stover | |
| 6,555,173 B1 | 4/2003 | Forsythe et al. | |
| 6,668,984 B2 | 12/2003 | Gray | |
| 6,737,120 B1 | 5/2004 | Golecki | |
| 6,884,467 B2 | 4/2005 | Walker et al. | |
| 6,896,968 B2 | 5/2005 | Golecki | |
| 6,913,821 B2 | 7/2005 | Golecki et al. | |
| 6,969,422 B2 | 11/2005 | Mazany et al. | |
| 7,011,888 B2 | 3/2006 | Bauer et al. | |
| 7,118,805 B2 | 10/2006 | Walker et al. | |
| 7,311,944 B2 | 12/2007 | Sambasivan et al. | |
| 7,501,181 B2 | 3/2009 | Walker et al. | |
| 7,641,941 B2 | 1/2010 | Mazany et al. | |
| 7,732,358 B2 | 6/2010 | Mazany et al. | |
| 7,785,712 B2 | 8/2010 | Miller et al. | |
| 7,938,877 B2 | 5/2011 | Liu et al. | |
| 7,968,192 B2 | 6/2011 | Manzany et al. | |
| 8,021,474 B2 | 9/2011 | Mazany et al. | |
| 8,021,758 B2 | 9/2011 | Sambasivan et al. | |
| 8,124,184 B2 | 2/2012 | Sambasivan et al. | |
| 8,322,754 B2 | 12/2012 | Carcagno et al. | |
| 8,962,083 B2 | 2/2015 | Murphy | |
| 9,126,873 B2 | 9/2015 | Diss et al. | |
| 9,758,678 B2 | 9/2017 | Nicolaus et al. | |
| 9,790,133 B2 | 10/2017 | Mazany | |
| 2002/0058576 A1 | 5/2002 | Mazany et al. | |
| 2002/0096407 A1 | 7/2002 | Gray | |
| 2002/0123592 A1* | 9/2002 | Zhang | C08G 77/04 528/10 |
| 2003/0143436 A1 | 7/2003 | Forsythe et al. | |
| 2004/0038032 A1 | 2/2004 | Walker et al. | |
| 2004/0038043 A1 | 2/2004 | Golecki | |
| 2004/0213906 A1 | 10/2004 | Mazany et al. | |
| 2005/0022698 A1 | 2/2005 | Mazany et al. | |
| 2006/0159909 A1* | 7/2006 | Aslan | C09D 5/18 428/323 |
| 2007/0154712 A1* | 7/2007 | Mazany | C04B 41/009 428/408 |
| 2008/0142148 A1 | 6/2008 | Mazany | |
| 2008/0311301 A1 | 12/2008 | Diss et al. | |
| 2010/0266770 A1 | 10/2010 | Mazany et al. | |
| 2011/0311804 A1 | 12/2011 | Diss | |
| 2013/0022826 A1 | 1/2013 | Kmetz | |
| 2014/0227511 A1 | 8/2014 | Mazany | |
| 2014/0349016 A1 | 11/2014 | Don | |
| 2015/0183998 A1 | 7/2015 | Belov et al. | |
| 2015/0291805 A1 | 10/2015 | Nicolaus et al. | |
| 2015/0362029 A1 | 12/2015 | Edwards et al. | |
| 2016/0280585 A1 | 9/2016 | Mazany | |
| 2016/0280612 A1 | 9/2016 | Mazany | |
| 2017/0369714 A1 | 12/2017 | Nicholaus | |

FOREIGN PATENT DOCUMENTS

| | | | |
|---|---|---|---|
| CN | 101712563 | 9/2012 | |
| CN | 103274760 | 9/2013 | |
| CN | 105237039 | 1/2016 | |
| EP | 200568 | 11/1986 | |
| EP | 0677499 | 10/1995 | |
| EP | 1043290 | 10/2000 | |
| EP | 1693262 | 8/2006 | |
| EP | 1968914 | 7/2010 | |
| EP | 2684752 | 1/2014 | |
| EP | 2767529 | 8/2014 | |
| EP | 2774900 | 9/2014 | |
| EP | 2930162 | 10/2015 | |
| EP | 3072865 | 9/2016 | |
| EP | 3072866 | 9/2016 | |
| EP | 3222602 | 9/2016 | |
| GB | 2468378 | 9/2010 | |
| JP | 09301786 | 11/1997 | |
| JP | 2006036551 | 2/2006 | |
| WO | 9742135 | 11/1997 | |
| WO | WO 97/42135 | * 11/1997 | C04B 41/52 |
| WO | 0051950 | 9/2000 | |
| WO | 2007078419 | 7/2007 | |
| WO | 2014035413 | 3/2014 | |
| WO | 2015169024 | 11/2015 | |

OTHER PUBLICATIONS

International Preliminary Report on Patentability dated Aug. 18, 2005 in Application No. PCT/US2004/012222.
International Search Report and Written Opinion dated Jul. 3, 2007 in Application No. PCT/US2006/043343.
Office Action dated Jan. 4, 2008 in Application No. 04816727.4.
Office Action dated Feb. 26, 2008 in U.S. Appl. No. 10/829,144.
International Preliminary Report on Patentability dated Mar. 12, 2008 in Application No. PCT/US2006/043343.
Final Office Action dated Jul. 16, 2008 in U.S. Appl. No. 10/829,144.
Office Action dated Oct. 24, 2008 in U.S. Appl. No. 10/829,144.
Communication Pursuant to Article 94(3) EPC dated Oct. 28, 2008 in European Application No. 06837063.4.
Restriction Requirement dated Feb. 5, 2009 in U.S. Appl. No. 11/315,592.
Final Office Action dated Jan. 29, 2009 in U.S. Appl. No. 10/829,144.
Communication Pursuant to Article 94(3) EPC dated Feb. 9, 2009 in European Application No. 06837063.4.
Office Action dated May 29, 2009 in U.S. Appl. No. 10/829,144.
Office Action dated Jun. 9, 2009 in U.S. Appl. No. 11/315,592.
Notice of Allowance dated Oct. 1, 2009 in U.S. Appl. No. 10/829,144.
Final Office Action dated Dec. 11, 2009 in U.S. Appl. No. 11/315,592.
Communication under Rule 71(3) EPC dated Feb. 4, 2010 in European Application No. 06837063.4.
Advisory Action dated Feb. 25, 2010 in U.S. Appl. No. 11/315,592.

(56) References Cited

OTHER PUBLICATIONS

Office Action dated Apr. 1, 2010 in U.S. Appl. No. 11/315,592.
Partial European Search Report dated Oct. 29, 2010 in European Application No. 10169627.6.
Office Action dated Feb. 4, 2011 in U.S. Appl. No. 12/619,061.
Office Action dated Feb. 22, 2011 in U.S. Appl. No. 12/829,178.
Extended European Search Report dated May 4, 2011 in European Application No. 10169627.6.
Final Office Action dated Aug. 19, 2011 in U.S. Appl. No. 12/829,178.
Advisory Action dated Oct. 27, 2011 in U.S. Appl. No. 12/829,178.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
McKee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
Rockwood Lithium, Spodumene Concentrate SC 7.5 premium, Aug. 2015, pp. 1-2, The Lithium Company.
Restriction Requirement dated Jan. 5, 2018 in U.S. Appl. No. 15/076,348.
Extended European Search Report dated Oct. 9, 2017 in European Application No. 17173709.1.
Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Preinterview First Office Action dated Mar. 6, 2017 in U.S. Appl. No. 14/671,637.
Restriction Requirement dated Nov. 7, 2016 in U.S. Appl. No. 14/671,637.
U.S. Appl. No. 15/076,348, filed Mar. 21, 2016 titled "High Temperature Oxidation Protection for Composites," 42 pages.
U.S. Appl. No. 15/169,219, filed May 31, 2016 titled "High Temperature Oxidation Protection for Composites," 37 pages.
U.S. Appl. No. 15/169,257, filed May 31, 2016 titled "High Temperature Oxidation Protection for Composites," 40 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/380,442, filed Dec. 15, 2016 titled "High Temperature Oxidation Protection for Composites," 41 pages.
First Action Interview Office Action dated May 12, 2017 in U.S. Appl. No. 14/671,637.
USPTO, Notice of Allowance dated Jun. 5, 2018 in U.S. Appl. No. 14/671,637.
USPTO, Restriction/Election Requirement dated Jun. 19, 2018 in U.S. Appl. No. 15/194,034.
USPTO, Corrected Notice of Allowance dated Jun. 22, 2018 in U.S. Appl. No. 14/671,637.
Steven A. Poteet, et al., U.S. Appl. No. 16/029,134, filed Jul. 6, 2018 titled "High Temperature Oxidation Protection for Composites ," 43 pages.
USPTO, Non Final Office Action dated Jul. 27, 2018 in U.S. Appl. No. 15/174,537.
European Patent Office, European Search Report dated Apr. 11, 2018 in Application No. 171834 78.1-1103.
USPTO, Advisory Action dated Mar. 30, 2018 in U.S. Appl. No. 14/671,637.
European Patent Office, European Search Report dated Apr. 11, 2018 in European Application No. 17183478.1-1103.
European Patent Office, European Search Report dated Apr. 13, 2018 in European Application No. 17207767.9-1106.
USPTO, Non Final Office Action dated May 1, 2018 in U.S. Appl. No. 15/076,348.
USPTO, Restriction/Election Requirement dated May 24, 2018 in U.S. Appl. No. 15/174,537.
European Patent Office, European Office Action dated Jul. 16, 2018 in Application No. 17174481.6.
Steven A. Poteet, U.S. Appl. No. 16/102,100, filed Aug. 13, 2018 titled "High Temperature Oxidation Protection for Composites ," 47 pages.
USPTO, Notice of Allowance dated Aug. 24, 2018 in U.S. Appl. No. 14/671,637.
Anthony Mazany, U.S. Appl. No. 16/116,665, filed Aug. 29, 2018 titled "Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
Final Office Action dated Jan. 17, 2018 in U.S. Appl. No. 14/671,637.
Communication Pursuant to Article 94(3) dated Jan. 3, 2018 in European Application No. 16161832.7.
Extended European Search Report dated Nov. 20, 2017 in European Application No. 17175809.7.
Extended European Search Report dated Nov. 20, 2017 in European Application No. 171758011.7.
Partial European Search Report dated Jan. 3, 2018 in European Application No. 17183478.1.
Extended European Search Report dated Nov. 6, 2017 in European Application No. 17174481.6.
USPTO, Final Office Action dated Nov. 5, 2018 in U.S. Appl. No. 15/076,348.
Steven A. Poteet, U.S. Appl. No. 16/190,817, filed Nov. 14, 2018 titled "High Temperature Oxidation Protection for Composites ," 38 pages.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Final Office Action filed Feb. 14, 2019 in U.S. Appl. No. 15/174,537.
USPTO, Notice of Allowance dated Apr. 3, 2019 in U.S. Appl. No. 15/169,257.
USPTO, Restriction/Election Requirement dated Apr. 5, 2019 in U.S. Appl. No. 15/380,442.
USPTO, Non-Final Office Action dated Apr. 16, 2019 in U.S. Appl. No. 15/076,348.
USPTO, Final Office Action dated May 15, 2019 in U.S. Appl. No. 15/194,034.
USPTO, Advisory Action dated May 17, 2019 in U.S. Appl. No. 15/174,537.
European Patent Office, European Search Report dated Aug. 28, 2019 in Application No. 17173707.5.
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites ," 45 pages.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action dated Jun. 21, 2019 in Application No. 19155021.9.
USPTO, Notice of Allowance filed Jun. 26, 2019 in U.S. Appl. No. 15/169,219.

(56) References Cited

OTHER PUBLICATIONS

USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.

* cited by examiner

HIGH TEMPERATURE OXIDATION PROTECTION FOR COMPOSITES

FIELD

The present disclosure relates generally to carbon-carbon composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures as high as 900° C. (1652° F.). Phosphate-based oxidation protection systems may reduce infiltration of oxygen and oxidation catalysts into the composite structure. However, despite the use of such oxidation protection systems, significant oxidation of the carbon-carbon composites may still occur during operation of components such as, for example, aircraft braking systems.

SUMMARY

A method for coating a composite structure is provided, in accordance with various embodiments, comprising applying a first slurry onto a surface of the composite structure, wherein the first slurry is a sol gel comprising a metal organic salt, a first carrier fluid, and a ceramic material, and heating the composite structure to a first sol gel temperature sufficient to form a sol gel-derived base layer on the composite structure. In various embodiments, the ceramic material may comprise at least one of silicon carbide nanoparticles, boron carbide particles, silicon nitride nanoparticles, titanium carbide nanoparticles, titanium boride particles, or titanium nitride nanoparticles. In various embodiments, the metal organic salt may comprise at least one of an aluminum compound, a silicon compound, a zirconium compound, a titanium compound, or a calcium compound. In various embodiments, the metal organic salt may comprise at least one of aluminum nitrate, aluminum isopropoxide, aluminum sec-butoxide, tetraethyl orthosilicate, zirconium n-propoxide, titanium isopropoxide, calcium nitrate. In various embodiments, the first slurry may be substantially free of at least one of phosphate glass or acid aluminum phosphate. In various embodiments, the first slurry may further comprise a pH modifier. The pH modifier may be at least one of acetic acid, ammonium hydroxide, nitric acid, or hydrochloric acid.

In various embodiments, applying the first slurry may be completed by at least one of spraying or brushing the first slurry onto the surface of the composite structure. In various embodiments, the method may further comprise forming a second slurry by combining a second pre-slurry composition with a second carrier fluid, wherein the second pre-slurry composition comprises a second phosphate glass composition, applying the second slurry to the sol gel-derived base layer, and heating the composite structure to a sealing temperature sufficient to form a sealing layer on the sol gel-derived base layer. In various embodiments, the method may further comprise applying at least one of a pretreating composition or a barrier coating to the composite structure prior to applying the first slurry to the composite structure.

In various embodiments, a sol gel for coating a composite structure may comprise a carrier fluid, a metal organic salt, and a ceramic material comprising a carbide, a boride, and/or a nitride. The sol gel may be configured to prevent oxidation of the composite structure. In various embodiments, the sol gel may further comprise at least one of acetic acid, ammonium hydroxide, nitric acid, or hydrochloric acid. In various embodiments, the sol gel may be substantially free of at least one of phosphate glass or acid aluminum phosphate. In various embodiments, the metal organic salt may comprise at least one of an aluminum compound, a silicon compound, a zirconium compound, a titanium compound, or a calcium compound.

In various embodiments, a method for coating a composite structure may comprise forming a first slurry by combining a first pre-slurry composition with a first carrier fluid, wherein the first pre-slurry composition comprises a first phosphate glass composition and at least one of silicon carbide or boron carbide, applying the first slurry to the composite structure, and heating the composite structure to a first glass slurry temperature sufficient to form a glass base layer on the composite structure. In various embodiments, the method may further comprise forming a second slurry by combining a second pre-slurry composition with a second carrier fluid, wherein the second pre-slurry composition may comprise a second phosphate glass composition, applying the second slurry to the glass base layer, heating the composite structure to a sealing temperature sufficient to form a sealing layer on the glass base layer.

In various embodiments, the method may further comprise applying a first pretreating composition to an outer surface of the composite structure prior to applying the first slurry to the composite structure, heating the first pretreating composition, and applying a second pretreating composition onto the first pretreating composition. The first pretreating composition may comprise aluminum oxide and water. The second pretreating composition may comprise at least one of a phosphoric acid or an acid phosphate salt, and an aluminum salt. The composite structure may be porous and the second pretreating composition may penetrate at least a pore of the composite structure. In various embodiments, the method may further comprise applying a barrier coating to the composite structure after applying the second pretreating composition, wherein the barrier coating comprises at least one of a carbide, a nitride, a boron nitride, a silicon carbide, a titanium carbide, a boron carbide, a silicon oxycarbide, a molybdenum disulfide, a tungsten disulfide, or a silicon nitride.

In various embodiments, at least one of the first phosphate glass composition or the second phosphate glass composition may be represented by the formula $a(A'_2O)_x(P_2O_5)_{y1}b(G_fO)_{y2}c(A''O)_z$:

A' is selected from: lithium, sodium, potassium, rubidium, cesium, and mixtures thereof;

$G_f$ is selected from: boron, silicon, sulfur, germanium, arsenic, antimony, and mixtures thereof;

A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;

a is a number in the range from 1 to about 5;

b is a number in the range from 0 to about 10;

c is a number in the range from 0 to about 30;

x is a number in the range from about 0.050 to about 0.500;

$y_1$ is a number in the range from about 0.100 to about 0.950;

$y_2$ is a number in the range from 0 to about 0.20; and
$z$ is a number in the range from about 0.01 to about 0.5;
$(x+y_1+y_2+z)=1$; and
$x<(y_1+y_2)$.

In various embodiments, at least one of the first slurry or the second slurry may comprise at least one of a surfactant, a polymer, nanoplatelets, graphene nanoplatelets, or acid aluminum phosphate.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1A:
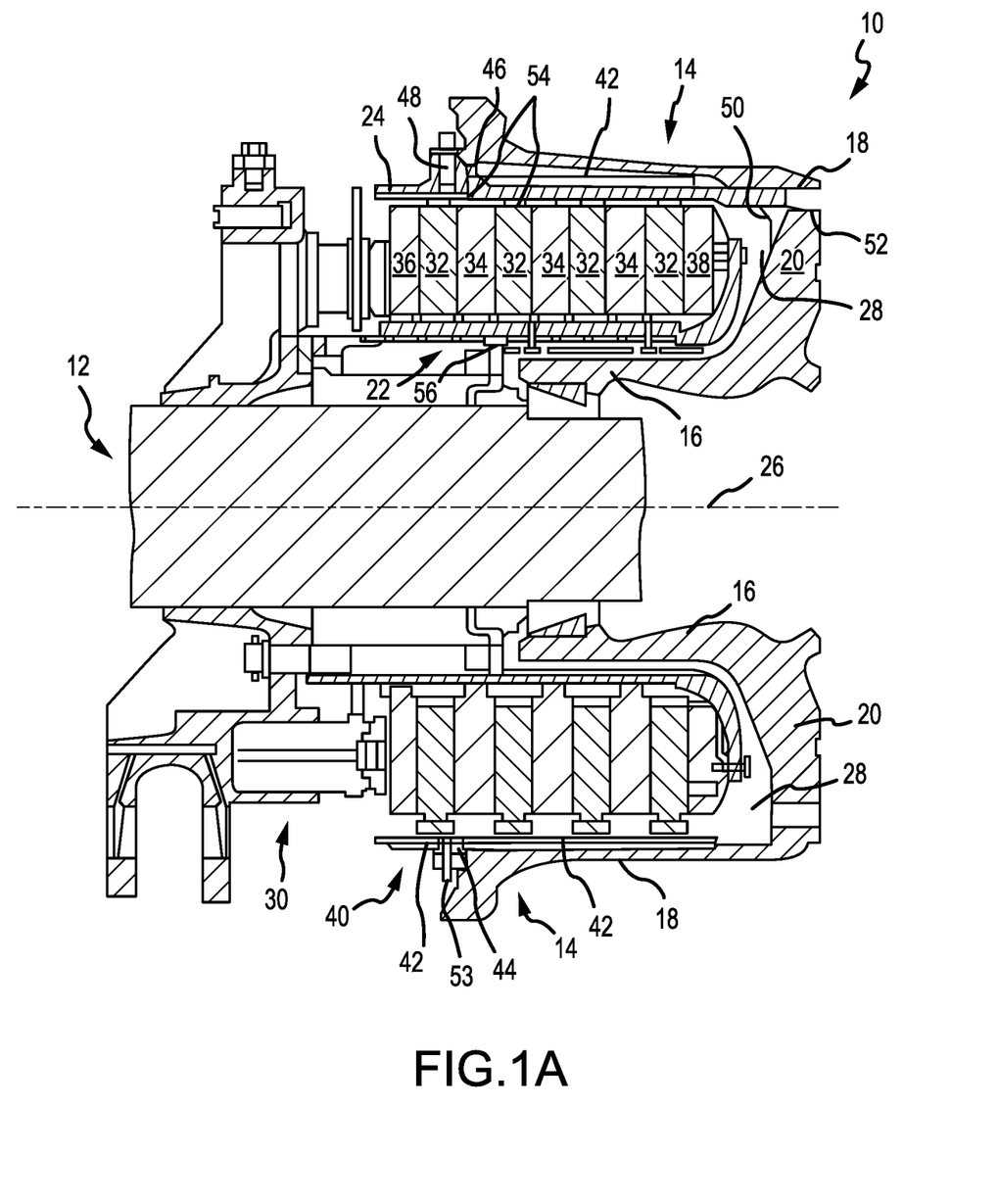
FIG. 1A illustrates a cross sectional view of an aircraft wheel braking assembly, in accordance with various embodiments.
Figure 1B:
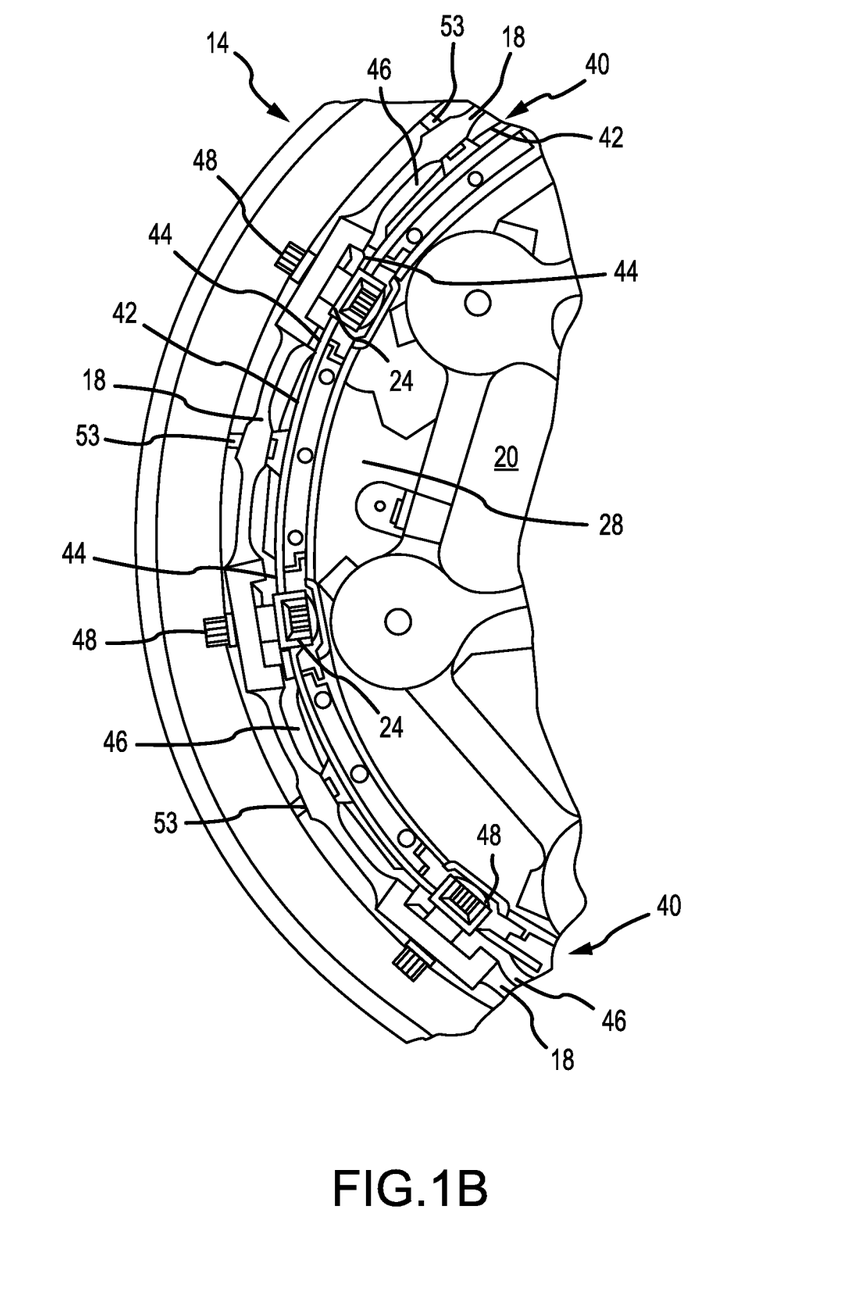
FIG. 1B illustrates a partial side view of an aircraft wheel braking assembly, in accordance with various embodiments.

With initial reference to FIGS. 1A and 1B, aircraft wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield sections 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield sections 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures in the range from about 100° C. (212° F.) up to about 900° C. (1652° F.). However, it will be recognized that the oxidation protection systems and methods of the present disclosure may be readily adapted to many parts in this and other braking assemblies, as well as to other carbon-carbon composite structures susceptible to oxidation losses from infiltration of atmospheric oxygen and/or catalytic contaminants. An oxidation protection system may comprise various layers being applied to a composite structure, such as layers formed by a pretreating composition, a first slurry to form a base layer, a second slurry to form a sealing layer, and/or various other layers.

In various embodiments, a method for limiting an oxidation reaction in a composite structure may comprise forming a first slurry, applying the first slurry to a composite structure, and heating the composite structure to a temperature sufficient to dry the carrier fluid and form an oxidation protection coating on the composite structure, which in various embodiments may be referred to a base layer. The base layer may also be referred to as a coating.

In various embodiments, the first slurry may be a first glass slurry comprising a first pre-slurry composition comprising a ceramic material and a first phosphate glass composition in the form of a glass frit, powder, or other suitable pulverized form, and a first carrier fluid (such as, for example, water). In various embodiments, the ceramic material may be silicon carbide nanoparticles, boron carbide particles, titanium diboride particles, titanium carbide nanoparticles, silicon nitride nanoparticles, titanium nitride particles, boron nitride, and/or other compounds comprising carbides, nitrides, or borides. In various embodiments, silicon carbide nanoparticles comprised in the first slurry may be 80-100 nanometers (nm) ($3.15 \times 10^{-6}$ inch to $3.94 \times 10^{-6}$ inch) in size, 45-55 nm ($1.77 \times 10^{-6}$ inch to $2.17 \times 10^{-6}$ inch) in size, or about 15 nm ($5.91 \times 10^{-7}$) inch in size. The term "about" as used in this context only means plus or minus 5 nm. In various embodiments, boron carbide particles may about 200 mesh in size (88 micrometers; 0.0029 inch). The term "about" as used in this context only means plus or minus 10 micrometers. In various embodiments, titanium diboride particles in the first slurry may be 2-12 micrometers ($7.87 \times 10^{-5}$ to $4.72 \times 10^{-4}$ inch) in size. In various embodiments, titanium carbide nanoparticles in the first slurry may be 80-130 nanometers (nm) ($3.15 \times 10^{-6}$ inch to $5.12 \times 10^{-6}$ inch) in size or about 40 nm ($1.57 \times 10^{-6}$ inch) in size. The term "about" as used in this context only means plus or minus 5 nm. In various embodiments, silicon nitride nanoparticles comprised in the first slurry may be 15-30 nanometers ($5.91 \times 10^{-7}$ to $1.18 \times 10^{-6}$ inch) in size. In various embodiments, titanium nitride nanoparticles in the first slurry may be about 20 nanometers ($7.87 \times 10^{-7}$ inch) in size. The term "about" as used in this context only means plus or minus 5 nm.

In various embodiments, the first pre-slurry composition of the first glass slurry may comprise additives, such as, for example, nanoplatelets (such as graphene-based nanoplatelets), a surfactant, among others, to improve hydrolytic stability and/or to increase the composite structure's resistance to oxidation, thereby tending to reduce mass loss of composite structure. In various embodiments, a slurry comprising acid aluminum phosphates having an aluminum (Al) to phosphoric acid ($H_3PO_4$) molar ratio of 1 to 3 or less, such as an Al:$H_3PO_4$ molar ratio of between 1 to 2 and 1 to 3, tends to provide increased hydrolytic stability without substantially increasing composite structure mass loss. In various embodiments, a slurry comprising acid aluminum phosphates having an Al:$H_3PO_4$ molar ratio between 1:2 to 1:3 produces an increase in hydrolytic protection and an unexpected reduction in composite structure mass loss.

In various embodiments, the first slurry may be a first slurry sol gel comprising an organic metal salt (i.e., a metal salt or metal alkoxide), a first carrier fluid (e.g., water), and/or a ceramic material. The ceramic material may be any of the ceramic materials discussed in relation to the first glass slurry herein. The organic metal salt may be aluminum or silicon-based, such as aluminum nitrate ($Al(NO_3)_3$), aluminum tri-sec butoxide, aluminum isopropoxide, and/or tetraethylorthosilicate ($Si(OCH_2(CH_3)_2)_4$) (TEOS). In various embodiments, the organic metal salt may be other suitable metal-based compounds such as zirconium n-propoxide, titanium isopropoxide, calcium nitrate, and/or any other suitable compound.

In various embodiments, the first slurry sol gel may further comprise a pH modifier to control the pH of the sol gel. In various embodiments, the pH modifier may be acetic acid, ammonium hydroxide, nitric acid, and/or hydrochloric acid, or any other suitable acid or base. The first slurry sol gel may further comprise other additives, such as alcohols and/or surfactants, to adjust the porosity of the sol gel. For example, the first slurry sol gel may comprise an additional alcohol such as propanol, isopropanol, methanol, ethanol, n-butanol, or any other suitable alcohol, and/or an ethoxylated acetylene-based or silicone-based surfactant. Additional compounds may be added to the first slurry sol gel such as glycerol and/or poly(ethylene) glycol to adjust viscosity. In various embodiments, the first slurry sol gel may be substantially free of a binder such as phosphate glass and/or acid aluminum phosphate. In this case, "substantially free" means less than 0.01 percent by weight.

Figure 2A:
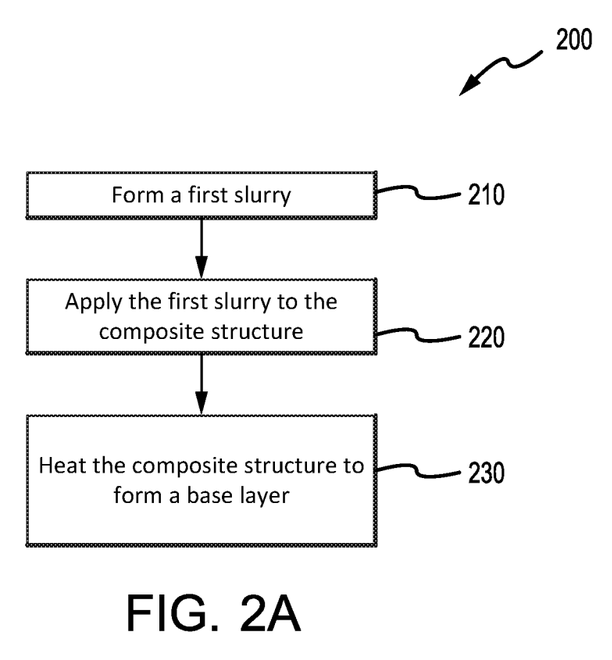
FIGS. 2A, 2B, and 2C illustrate methods for coating a composite structure, in accordance with various embodiments.

With initial reference to FIG. 2A, a method 200 for coating a composite structure with an oxidation protection system in accordance with various embodiments is illustrated. Method 200 may, for example, comprise applying an oxidation protection system to non-wearing surfaces of carbon-carbon composite brake components. In various embodiments, method 200 may be used on the back face of pressure plate 36 and/or end plate 38, an inner diameter (ID) surface of stators 34 including slots 56, as well as outer diameter (OD) surfaces of rotors 32 including lugs 54. The oxidation inhibiting composition of method 200 may be applied to preselected regions of a carbon-carbon composite structure that may be otherwise susceptible to oxidation. For example, aircraft brake disks may have the oxidation inhibiting composition applied on or proximate stator slots 56 and/or rotor lugs 54.

In various embodiments, method 200 may comprise forming a first slurry (step 210). In various embodiments, as described herein, the first slurry may be a first glass slurry, which may be formed by combining a first pre-slurry composition, comprising a ceramic material and a first phosphate glass composition in the form of a glass frit, powder, or other suitable pulverized and/or ground form, with a first carrier fluid (such as, for example, water). The ceramic material may be any of the ceramic materials described herein. For example, the ceramic material may be added to the first pre-slurry composition such that the resulting first pre-slurry composition comprises between about 5 weight percent and about 15 weight percent of ceramic material, or about 8 to about 12 weight percent of ceramic material, wherein the term "about" in this context only means plus or minus 2 weight percent. In various embodiments, the first slurry may comprise an acid aluminum phosphate wherein the molar ratio of Al:$H_3PO_4$ may be between 1:2 to 1:3, between 1:2.2 to 1:3, between 1:2.5 to 1:3, between 1:2.7 to 1:3 or between 1:2.9 to 1:3.

The first phosphate glass composition may comprise one or more alkali metal glass modifiers, one or more glass network modifiers and/or one or more additional glass formers. In various embodiments, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5 by weight.

Potential alkali metal glass modifiers may be selected from oxides of lithium, sodium, potassium, rubidium, cesium, and mixtures thereof. In various embodiments, the glass modifier may be an oxide of lithium, sodium, potassium, or mixtures thereof. These or other glass modifiers may function as fluxing agents. Additional glass formers can include oxides of boron, silicon, sulfur, germanium, arsenic, antimony, and mixtures thereof.

Suitable glass network modifiers include oxides of vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof.

The first phosphate glass composition may be prepared by combining the above ingredients and heating them to a fusion temperature. In various embodiments, depending on the particular combination of elements, the fusion temperature may be in the range from about 700° C. (1292° F.) to about 1500° C. (2732° F.). The resultant melt may then be cooled and pulverized and/or ground to form a glass frit or powder. In various embodiments, the first phosphate glass composition may be annealed to a rigid, friable state prior to being pulverized. Glass transition temperature ($T_g$), glass softening temperature ($T_s$) and glass melting temperature ($T_m$) may be increased by increasing refinement time and/or temperature. Before fusion, the first phosphate glass composition comprises from about 20 mol % to about 80 mol % of $P_2O_5$. In various embodiments, the first phosphate glass composition comprises from about 30 mol % to about 70 mol % $P_2O_5$, or precursor thereof. In various embodiments, the first phosphate glass composition comprises from about 40 to about 60 mol % of $P_2O_5$.

The first phosphate glass composition may comprise from about 5 mol % to about 50 mol % of the alkali metal oxide.

In various embodiments, the first phosphate glass composition comprises from about 10 mol % to about 40 mol % of the alkali metal oxide. Further, the first phosphate glass composition comprises from about 15 to about 30 mol % of the alkali metal oxide or one or more precursors thereof. In various embodiments, the first phosphate glass composition may comprise from about 0.5 mol % to about 50 mol % of one or more of the above-indicated glass formers. The first phosphate glass composition may comprise about 5 to about 20 mol % of one or more of the above-indicated glass formers. As used herein, mol % is defined as the number of moles of a constituent per the total moles of the mixture.

In various embodiments, the first phosphate glass composition can comprise from about 0.5 mol % to about 40 mol % of one or more of the above-indicated glass network modifiers. The first phosphate glass composition may comprise from about 2.0 mol % to about 25 mol % of one or more of the above-indicated glass network modifiers.

In various embodiments, the first phosphate glass composition may be represented by the formula:

$$a(A'_2O)_x(P_2O_5)_{y_1}b(G_fO)_{y_2}c(A''O)_z \qquad [1]$$

In Formula 1, A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.100 to about 0.950; $y_2$ is a number in the range from 0 to about 0.20; and z is a number in the range from about 0.01 to about 0.5; $(x+y_1+y_2+z)=1$; and $x<(y_1+y_2)$. The first phosphate glass composition may be formulated to balance the reactivity, durability and flow of the resulting glass barrier layer for optimal performance.

In various embodiments, first phosphate glass composition in glass frit form may be combined with additional components to form the first pre-slurry composition. For example, crushed first phosphate glass composition in glass frit form may be combined with ammonium hydroxide, ammonium dihydrogen phosphate, nanoplatelets (such as graphene-based nanoplatelets), among other materials and/or substances. For example, graphene nanoplatelets could be added to the first phosphate glass composition in glass frit form. In various embodiments, the additional components may be combined and preprocessed before combining them with first phosphate glass composition in glass frit form. Other suitable additional components include, for example, surfactants such as, for example, an ethoxylated low-foam wetting agent and flow modifiers, such as, for example, polyvinyl alcohol, polyacrylate, or similar polymers.

In various embodiments, the first slurry may be the first slurry sol gel described herein. In various embodiments, involving the first slurry sol get, step 210 may comprise combining an organic metal salt, a first carrier fluid, a ceramic material, a pH modifier, and/or additional alcohols and/or surfactants to adjust the porosity of the sol gel. Such components of the first slurry sol gel may be any of the examples of the components discussed herein.

In various embodiments, forming the first slurry sol gel may comprise combining the first carrier fluid (i.e., water) with the metal organic salt to hydrolyze the metal organic salt to form a solution. The metal organic salt may be dissolved in an organic solvent prior to the hydrolysis. The solution then may undergo a polycondensation reaction (i.e., gelling) forming a network of interconnected alkoxides (i.e., a gel). The gel is then allowed to age for a desired amount of time and then dried to remove the organic solvent. A final calcination step may remove any remaining organic compounds from the sol gel system. The ceramic material (i.e., the ceramic powder) may be mixed into the sol gel system ultrasonically, or by any other suitable method, before, during, or after the polycondensation reaction. A pH modifier, additional alcohols, and/or surfactants may also be added to the sol gel system, which may be any examples of such components discussed herein.

As an illustrative example of forming an aluminum-based sol gel for the first slurry sol gel, aluminum tri-sec butoxide, ethanol, and water may be combined in a 1:16:0.6 mass ratio, respectively, to form a solution. The ceramic material may be added to the solution, making up about 5-90% weight percent of the solution. In various embodiments, the ceramic material may make up 20-70% weight of the solution, or 40-50% weight of the solution. A small amount of methanol and water may be added to the solution to control porosity (solution:methanol:water in a 1 g:0.2 g:0.0003 g mass ratio). Subsequently, 1 mL of acetic acid may be added for every 30 mL of the resulting solution to gel the resulting solution.

As an illustrative example of forming a silicon-based sol gel for the first slurry sol gel, TEOS, ethanol, DI water, and acetic acid may be combined in a mass ratio of 1:4:4:0.05, respectively. The ceramic material may then be added, making about 5-90% weight percent of the solution. In various embodiments, the ceramic material may make up 20-70% weight of the solution, or 40-50% weight of the solution.

In various embodiments, method 200 further comprises applying the first slurry to a composite structure (step 220). Applying the first slurry may comprise, for example, spraying or brushing the first slurry onto an outer surface of the composite structure. Any suitable manner of applying the first slurry to the composite structure is within the scope of the present disclosure. As referenced herein, the composite structure may refer to a carbon-carbon composite structure.

In various embodiments, method 200 further comprises a step 230 of heating the composite structure to a temperature sufficient to form a base layer from the first slurry. In various embodiments involving the first glass slurry, the composite structure may be heated (e.g., dried or baked) at to a first glass slurry temperature, to form a glass base layer, in the range from about 200° C. (292° F.) to about 1000° C. (1832° F.), or from about 600° C. (1112° F.) to about 1000° C. (1832° F.), or between about 200° C. (292° F.) to about 900° C. (1652° F.), or further, between about 400° C. (752° F.) to about 850° C. (1562° F.). Step 230 may, for example, comprise heating the composite structure for a period between about 0.5 hour and about 8 hours, wherein the term "about" in this context only means plus or minus 0.25 hours.

In various embodiments, the composite structure with the first glass slurry may be heated to a lower first glass slurry temperature first (for example, about 30° C. (86° F.) to about 400° C. (752° F.)) to bake or dry the glass base layer at a controlled depth. A second glass slurry temperature, which may be higher than the first glass slurry temperature, (for example, about 300° C. (572° F.) to about 1000° C. (1832° F.)) may then be used to form a deposit from the glass base layer within the pores of the composite structure. The duration of each heating step can be determined as a fraction of the overall heating time and can range from about 10% to about 50%, wherein the term "about" in this context only means plus or minus 5%. In various embodiments, the duration of the lower first glass slurry temperature heating step(s) can range from about 20% to about 40% of the overall heating time, wherein the term "about" in this context only means plus or minus 5%. The lower first glass slurry temperature step(s) may occupy a larger fraction of the overall heating time, for example, to provide relatively slow heating up to and through the first lower first glass slurry temperature. The exact heating profile will depend on a combination of the first lower first glass slurry temperature and desired depth of the drying portion.

Step 230 may be performed in an inert environment, such as under a blanket of inert gas or less reactive gas (e.g., nitrogen ($N_2$), argon, other noble gases and the like). For example, a composite structure may be pretreated or warmed prior to application of the first glass slurry to aid in the penetration of the first glass slurry. Step 230 may be for a period of about 2 hours at a temperature of about 600° C. (1112° F.) to about 800° C. (1472° F.), wherein the term "about" in this context only means plus or minus 10° C. The composite structure and glass base layer may then be dried or baked in a non-oxidizing, inert or less reactive atmosphere, e.g., noble gasses and/or nitrogen ($N_2$), to optimize the retention of the first pre-slurry composition of the glass base layer in the pores of the composite structure. This retention may, for example, be improved by heating the composite structure to about 200° C. (392° F.) and maintaining the temperature for about 1 hour before heating the carbon-carbon composite to a temperature in the range described above. The temperature rise may be controlled at a rate that removes water without boiling, and provides temperature uniformity throughout the composite structure.

In various embodiments involving the first slurry sol gel, with further reference to step 230, the composite structure may be heated to a first sol gel temperature in a temperature range from about 100° C. (212° F.) to about 150° C. (302° F.), or from about 115° C. (239° F.) to about 135° C. (275° F.), to form a sol gel-derived base layer. In various embodiments, a second sol gel temperature, which may be higher than the first sol gel temperature, (for example, about 300° C. (572° F.) to about 1100° C. (2012° F.)) may then be used to form a crystalline sol gel-derived base layer. Heating the composite structure at the first or second sol gel temperatures may take place for any of the durations described herein in relation to the first and/or second glass slurry temperatures. Subsequent to heating the composite structure to the first and/or second sol gel temperature, the first slurry sol gel may be reapplied to the composite structure one or more additional times, similar to step 220, thereby creating multiple sol gel-derived base layers from the first slurry sol gel.

Figure 2B:
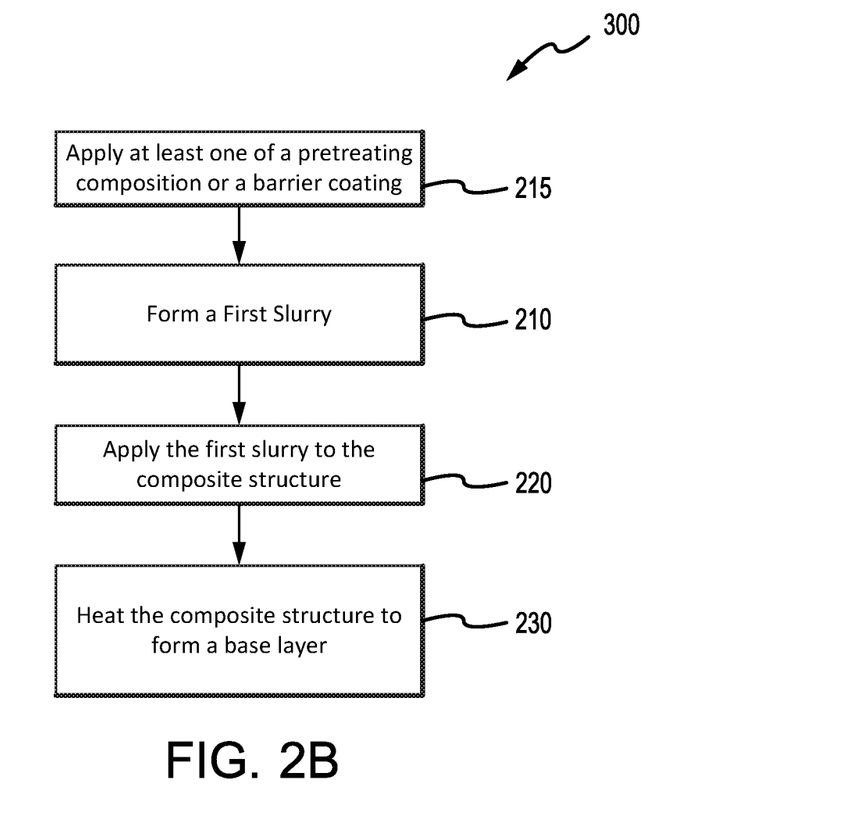

In various embodiments and with reference now to FIG. 2B, method 300, which comprises steps also found in method 200, may further comprise applying at least one of a pretreating composition or a barrier coating (step 215) prior to applying the first slurry. Throughout the figures and methods described herein, like numbered items are intended to be the same and will not be repeated for the sake of clarity. Step 215 may, for example, comprise applying a first pretreating composition to an outer surface of a composite structure, such as a component of aircraft wheel braking assembly 10. In various embodiments, the first pretreating composition comprises an aluminum oxide in water. For example, the aluminum oxide may comprise an additive, such as a nanoparticle dispersion of aluminum oxide (for example, NanoBYK-3600®, sold by BYK Additives & Instruments). The first pretreating composition may further comprise a surfactant or a wetting agent. The composite structure may be porous, allowing the pretreating composition to penetrate at least a portion of the pores of the composite structure.

In various embodiments, after applying the first pretreating composition, the component may be heated to remove water and fix the aluminum oxide in place. For example, the component may be heated between about 100° C. (212° F.) and 200° C. (392° F.), and further, between 100° C. (212° F.) and 150° C. (302° F.).

Step 215 may further comprise applying a second pretreating composition. In various embodiments, the second pretreating composition comprises a phosphoric acid and an aluminum phosphate, aluminum hydroxide, and/or aluminum oxide. The second pretreating composition may further comprise, for example, a second metal salt such as a magnesium salt. In various embodiments, the aluminum to phosphorus molar ratio of the aluminum phosphate is 1 to 3 or less by weight. Further, the second pretreating composition may also comprise a surfactant or a wetting agent. In various embodiments, the second pretreating composition is applied to the composite structure atop the first pretreating composition. The composite structure may then, for example, be heated. In various embodiments, the composite structure may be heated between about 600° C. (1112° F.) and about 800° C. (1472° F.), and further, between about 650° C. (1202° F.) and 750° C. (1382° F.).

Step 215 may further comprise applying a barrier coating to an outer surface of a composite structure, such as a component of aircraft wheel braking assembly 10. In various embodiments, the barrier coating composition may comprise carbides or nitrides, including at least one of a boron nitride, silicon carbide, titanium carbide, boron carbide, silicon oxycarbide, and silicon nitride. In various embodiments, the barrier coating may be formed by treating the composite structure with molten silicon. The molten silicon is reactive and may form a silicon carbide barrier on the composite structure. Step 215 may comprise, for example, application of the barrier coating by spraying, chemical vapor deposition (CVD), molten application, or brushing the barrier coating composition onto the outer surface of the carbon-carbon composite structure. Any suitable manner of applying the barrier layer to composite structure is within the scope of the present disclosure.

Figure 2C:
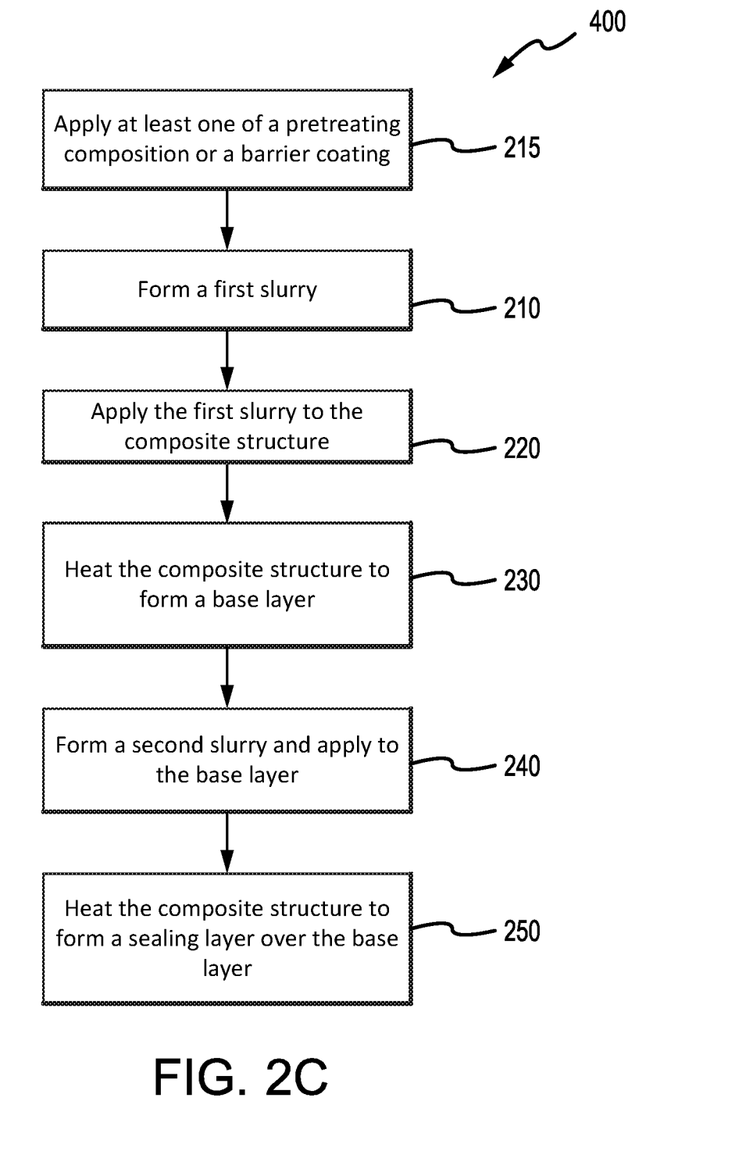

In various embodiments and with reference now to FIG. 2C, method 400 may further comprise a step 240 of forming a second slurry by combining a second pre-slurry composition, which may comprise a second phosphate glass composition in glass frit or powder form, with a second carrier fluid (such as, for example, water). In various embodiments, the second slurry may comprise an acid aluminum phosphate wherein the molar ratio of aluminum (Al) to phosphoric acid ($H_3PO_4$) may be between 1:2 to 1:3, between 1:2.2 to 1:3, between 1:2.5 to 1:3, between 1:2.7 to 1:3 or between 1:2.9 to 1:3. In various embodiments, the second slurry may comprise a second pre-slurry composition substantially free of phosphate glass, comprising acid aluminum phosphate and orthophosphoric acid with an aluminum to phosphate ratio of 1:2 to 1:5. As used herein "substantially free" means comprising less than 0.01% by weight of a substance. Further, step 240 may comprise spraying or brushing the second slurry of the second phosphate glass composition on to an outer surface of the base layer. Any suitable manner of applying the sealing layer is within the scope of the present disclosure.

In various embodiments, the second slurry may be substantially free of boron nitride. In this case, "substantially free" means less than 0.01 percent by weight. For example, the second pre-slurry composition may comprise any of the components of the pre-slurry compositions and/or glass compositions described in connection with the first pre-slurry composition and/or first phosphate glass composition, without the addition of a boron nitride additive. In various embodiments, the second pre-slurry mixture may comprise the same pre-slurry composition and/or phosphate glass composition used to prepare the first pre-slurry composition and/or the first phosphate glass composition. In various embodiments, the second pre-slurry composition may comprise a different pre-slurry composition and/or phosphate glass composition than the first pre-slurry composition and/or first phosphate glass composition.

In various embodiments, the first slurry and/or the second slurry may comprise an additional metal salt. The cation of the additional metal salt may be multivalent. The metal may be an alkaline earth metal or a transition metal. In various embodiments, the metal may be an alkali metal. The multivalent cation may be derived from a non-metallic element and/or a metalloid element such as boron. The metal of the additional metal salt may be an alkaline earth metal such as calcium, magnesium, strontium, barium, or a mixture of two or more thereof. The metal for the additional metal salt may be iron, manganese, tin, zinc, or a mixture of two or more thereof. The anion for the additional metal salt may be an inorganic anion such as a phosphate, halide, sulfate or nitrate, or an organic anion such as acetate. In various embodiments, the additional metal salt may be an alkaline earth metal salt such as an alkaline earth metal phosphate. In various embodiments, the additional metal salt may be a magnesium salt such as magnesium phosphate. In various embodiments, the additional metal salt may be an alkaline earth metal nitrate, an alkaline earth metal halide, an alkaline earth metal sulfate, an alkaline earth metal acetate, or a mixture of two or more thereof. In various embodiments, the additional metal salt may be magnesium nitrate, magnesium halide, magnesium sulfate, or a mixture of two or more thereof. In various embodiments, the additional metal salt may comprise: (i) magnesium phosphate; and (ii) a magnesium nitrate, magnesium halide, magnesium sulfate, or a mixture of two or more thereof.

The additional metal salt may be selected with reference to its compatibility with other ingredients in the first slurry and/or the second slurry. Compatibility may include metal phosphates that do not precipitate, flocculate, agglomerate, react to form undesirable species, or otherwise become segregated from the first slurry prior to application of the first slurry and/or the second slurry to the carbon-carbon composite. The phosphates may be monobasic ($H_2PO_4^-$), dibasic ($HPO_4^{-2}$), or tribasic ($PO_4^{-3}$). The phosphates may be hydrated. Examples of alkaline earth metal phosphates that may be used include calcium hydrogen phosphate (calcium phosphate, dibasic), calcium phosphate tribasic octahydrate, magnesium hydrogen phosphate (magnesium phosphate, dibasic), magnesium phosphate tribasic octahydrate, strontium hydrogen phosphate (strontium phosphate, dibasic), strontium phosphate tribasic octahydrate and barium phosphate.

In various embodiments, a chemical equivalent of the additional metal salt may be used as the additional metal salt. Chemical equivalents include compounds that yield an equivalent (in this instance, an equivalent of the additional metal salt) in response to an outside stimulus such as, temperature, hydration, or dehydration. For example, equivalents of alkaline earth metal phosphates may include alkaline earth metal pyrophosphates, hypophosphates, hypophosphites and orthophosphites. Equivalent compounds include magnesium and barium pyrophosphate, magnesium and barium orthophosphate, magnesium and barium hypophosphate, magnesium and barium hypophosphite, and magnesium and barium orthophosphite.

While not wishing to be bound by theory, it is believed that the addition of multivalent cations, such as alkaline earth metals, transition metals, nonmetallic elements, and/or metalloids such as boron, to the first slurry and/or the second slurry enhances the hydrolytic stability of the metal-phosphate network. In general, the hydrolytic stability of the metal-phosphate network increases as the metal content increases, however a change from one metallic element to another may influence oxidation inhibition to a greater extent than a variation in the metal-phosphate ratio. The solubility of the phosphate compounds may be influenced by the nature of the cation associated with the phosphate anion. For example, phosphates incorporating monovalent cations such as sodium orthophosphate or phosphoric acid (hydrogen cations) are very soluble in water while (tri)barium orthophosphate is insoluble. Phosphoric acids can be condensed to form networks but such compounds tend to remain hydrolytically unstable. Generally, it is believed that the multivalent cations link phosphate anions creating a phosphate network with reduced solubility. Another factor that may influence hydrolytic stability is the presence of —P—O—H groups in the condensed phosphate product formed from the first slurry and/or the second slurry during thermal treatment. The first slurry and/or the second slurry may be formulated to minimize concentration of these species and any subsequent hydrolytic instability. Whereas increasing the metal content may enhance the hydrolytic stability of the first slurry and/or the second slurry, it may be desirable to balance composition stability and effectiveness as an oxidation inhibitor.

In various embodiments, the additional metal salt may be present in the first slurry and/or the second slurry at a concentration in the range from about 0.5 weight percent to about 30 weight percent, and in various embodiments from about 0.5 weight percent to about 25 weight percent, and in various embodiments from about 5 weight percent to about 20 weight percent. In various embodiments, a combination of two or more additional metal salts may be present at a concentration in the range from about 10 weight percent to about 30 weight percent, and in various embodiments from about 12 weight percent to about 20 weight percent.

Method 400 may further comprise a step 250 of heating the composite structure to a temperature sufficient to form a sealing layer, which may comprise phosphate glass, over the base layer. Such a temperature may be referred to as a sealing layer temperature. Similar to step 230, the composite structure may be heated to a sealing temperature sufficient to adhere the sealing layer to the base layer. For example, step 250 may comprise drying or baking the carbon-carbon composite structure at a sealing temperature in the range from about 200° C. (392° F.) to about 1000° C. (1832° F.). In various embodiments, the composite structure is heated to a sealing temperature in a range from about 600° C. (1112° F.) to about 1000° C. (1832° F.), or between about 200° C. (392° F.) to about 900° C. (1652° F.), or further, between about 400° C. (752° F.) to about 850° C. (1562° F.), wherein in this context only, the term "about" means plus or minus 10° C. Further, step 250 may, for example, comprise heating the composite structure for a period between about 0.5 hour and about 8 hours, where the term "about" in this context only means plus or minus 0.25 hours.

In various embodiments, step 250 may comprise heating the composite structure to a first, lower temperature (for example, about 30° C. (86° F.) to about 300° C. (572° F.)) followed by heating at a second, higher temperature (for example, about 300° C. (572° F.) to about 1000° C. (1832° F.)). Further, step 250 may be performed in an inert environment, such as under a blanket of inert or less reactive gas (e.g., nitrogen, argon, other noble gases, and the like).

TABLE 1 illustrates a variety of slurries comprising phosphate glass compositions prepared in accordance with various embodiments.

TABLE 1

| Example » | A | B | C | D1 |
|---|---|---|---|---|
| h-Boron nitride powder | — | 8.75 | 8.75 | — |
| SiC nanopowder | — | — | — | 2.2 |
| $B_4C$ | — | — | — | — |
| Graphene nanoplatelets | — | 0.15 | 0.15 | 0.10 |
| $H_2O$ | 52.4 | 50.0 | 60.0 | 35.0 |
| Surfynol 465 surfactant | — | 0.2 | 0.2 | 0.1 |
| Glass frit | 34.0 | 26.5 | 26.5 | 13.3 |
| Acid aluminum phosphate (1:2.5 Al—P) | — | — | 5.0 | 2.5 |
| Ammonium dihydrogen phosphate (ADHP) | 11.33 | 0.50 | — | — |

As illustrated in TABLE 1, oxidation protection system slurries comprising a phosphate glass composition glass frit in a carrier fluid (i.e., water) and various additives (listed in units of grams) were prepared. The various additives in the various slurries include h-boron nitride, SiC nanopowder, graphene nanoplatelets, a surfactant, a flow modifier such as, for example, ammonium dihydrogen phosphate, and/or acid aluminum phosphates with $Al:H_3PO_4$ molar ratios of between 1 to 2 and 1 to 3. Glass composition A may illustrate a suitable sealing layer formed from a second slurry, and glass compositions B, C, and D1 may illustrate suitable glass base layers formed from first glass slurries. Slurry D1 comprises 2.2 weight parts of silicon carbide nanoparticles in place of boron nitride comprised in slurries B and C. Slurries C and D1 comprise an acid aluminum phosphate solution with an aluminum to phosphorus ratio of 1:2.5.

TABLE 2

| Data Set | 305 | 310 | 315 | 320 |
|---|---|---|---|---|
| Pretreatment | Yes | No | No | No |
| Glass Base Layer | — | B | C | D1 |
| Sealing Layer | A | A | A | A |

| Oxidation Temp | Exposure Time (Hours) | Percentage Weight Loss | | |
|---|---|---|---|---|
| 760 Degrees C. | 0 | 0.00 | 0.00 | 0.00 | 0.00 |
| | 4 | 0.38 | 0.09 | 0.04 | 0.31 |
| | 8 | 1.56 | 0.36 | 0.13 | 1.05 |
| | 12 | 4.63 | 0.94 | 0.31 | 2.14 |
| | 16 | 9.57 | 2.59 | 0.70 | 4.19 |
| | 20 | 15.94 | 5.93 | 1.39 | 7.25 |
| | 24 | 24.11 | 11.44 | 2.72 | 11.61 |

With combined reference to TABLES 1 and 2, the first slurries B, C, and D1, comprised in oxidation protection systems represented by data sets 310, 315, and 320, respectively, were applied to 50 gram carbon-carbon composite structure coupons and cured in inert atmosphere under heat at 899° C. (1650° F.) to form glass base layers. After cooling, second slurry A was applied atop each of the cured glass base layers and the coupons were fired again in an inert atmosphere. Data set 305 represents a coupon that was pretreated with an alumina nanoparticle (i.e., a first pretreating composition as discussed in association with step 215) and given an acid aluminum phosphate layer (i.e., a second pretreating composition as discussed in association with step 215) with a Al:H$_3$PO$_4$ molar ratio of about 1 to 3.3, as described in various embodiments, and cured under an inert atmosphere. Second slurry A was applied atop the cured pretreated coupon and then fired again under an inert atmosphere forming a sealing layer. After cooling, the coupons were subjected to isothermal oxidation testing a 760° C. (1400° F.) over a period of hours while monitoring mass loss.

Figure 3:
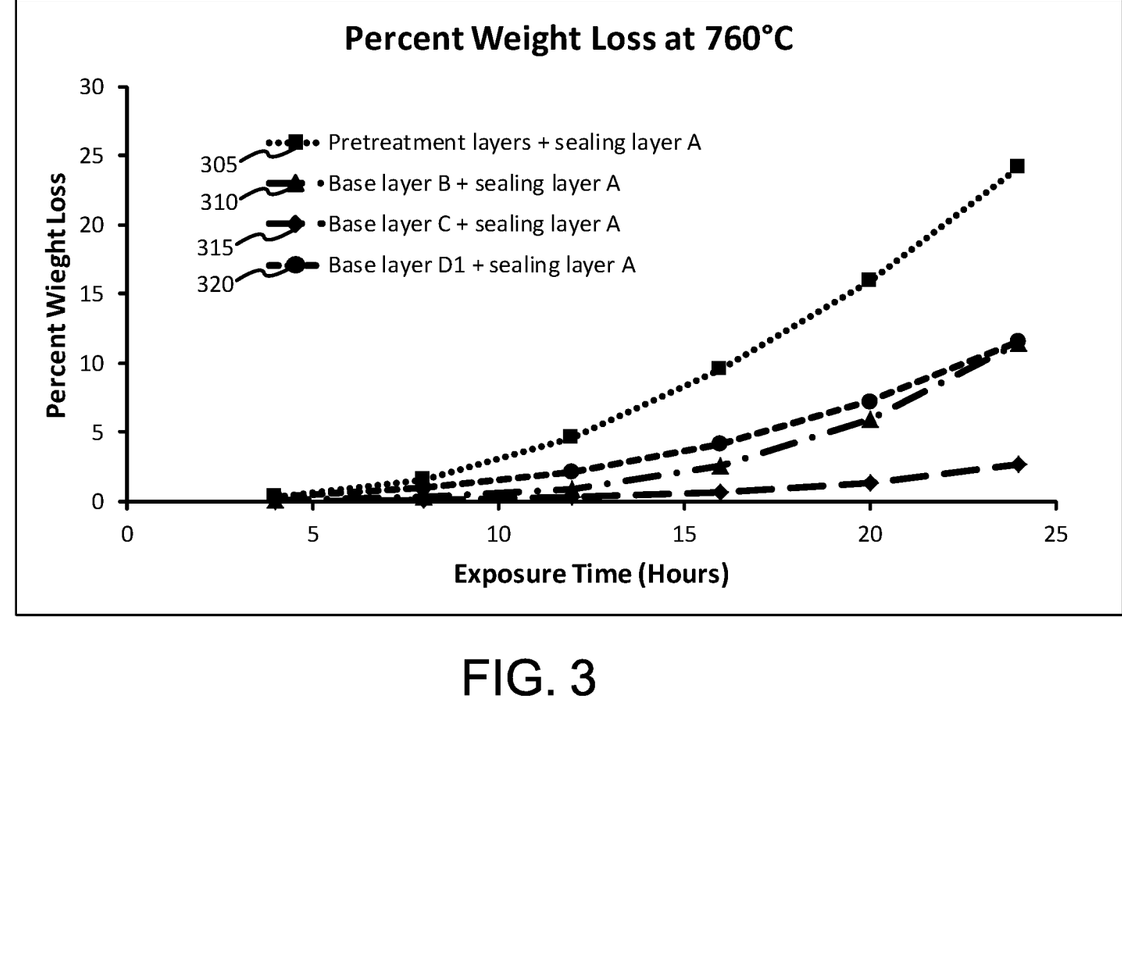
FIG. 3 illustrates experimental data obtained from testing various oxidation protection systems, in accordance with various embodiments.

With combined reference to TABLES 1 and 2, and FIG. 3, the performance of the described coatings, according to various embodiments, is illustrated in FIG. 3. Percent weight loss is shown in the y-axis and exposure time is shown in the x-axis. Oxidation protection system represented by data set 305, without a base layer, lost more weight over the 24-hour period of exposure to the 760° C. (1400° F.) heat than the other oxidation protection systems. The oxidation protection system represented by data set 315, having a glass base layer C, lost the least amount of weight of the composite. The oxidation protection system represented by data sets 310 and 320, having glass base layers B and D1, respectively, had comparable weight loss over the 24 hour period. However, glass base layer D1 used under half of the weight percent of ceramic material (4.14% weight SiC) than glass base layer B (10.16% weight boron nitride) yet achieved similar oxidation protection. The effect of using a ceramic material other than boron nitride had an unexpected effect in oxidation protection over first slurries with boron nitride on the carbon-carbon composite structure, especially while using significantly less ceramic material than boron nitride. Such use of ceramic materials other than boron nitride for oxidation protection may prove more cost-effective because a reduced mass of the material is used for effective oxidation protection, providing enhanced oxidation protection while still operating as a sprayable coating material. Systems comprising silicon carbide generally require application by CVD, which is significantly more expensive than spraying.

TABLE 3 lists additional possible first glass slurries comprising ceramic materials (with less or no boron nitride compared to slurries B and C in TABLE 1) which may be sprayable in application to the composite structure, having ceramic material weight percentages ranging between 8% weight to 13% weight of the slurries.

phosphate glass and/or acid aluminum phosphate because the sol gel may penetrate the porosity of the composite structure without the need for such a binder. Therefore, first slurry sol gels may provide similar oxidation protection shown by data set 320 in FIG. 3, while being relatively inexpensive as compared to slurries comprising phosphate glass and/or acid aluminum phosphate.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the

TABLE 3

| Example>> | D2 | D3 | D4 | D5 | D6 | D7 | D8 | D9 |
|---|---|---|---|---|---|---|---|---|
| h-Boron nitride powder | 4.375 | 0.50 | — | — | — | — | — | 2.92 |
| SiC nanopowder | 4.38 | 8.25 | 8.75 | 8.75 | 4.38 | 4.38 | — | 2.92 |
| B$_4$C | — | — | — | — | 4.38 | 4.38 | 8.75 | 2.92 |
| Graphene nanoplatelets | 0.15 | 0.15 | 0.15 | 0.15 | 0.15 | 0.15 | 0.15 | 0.15 |
| H$_2$O | 60.0 | 60.0 | 60.0 | 60.0 | 60.0 | 60.0 | 60.0 | 60.0 |
| Surfynol 465 surfactant | 0.2 | 0.2 | 0.2 | 0.2 | 0.2 | 0.2 | 0.2 | 0.2 |
| Glass frit | 26.5 | 26.5 | 26.5 | — | 26.5 | — | 26.5 | 26.5 |
| Acid aluminum phosphate (1:2.5 Al—P) | 5.0 | 5.0 | 5.0 | — | 5.0 | — | 5.0 | 5.0 |

In various embodiments, first slurry sol gels are also sprayable in application to a composite structure, making their application to a composite structure less expensive than a slurry requiring application by CVD. Additionally, first slurry sol gels may be substantially free of a binder such as public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an oxidation protection system on a carbon-carbon composite structure, comprising:
    applying a first slurry onto a surface of the composite structure, wherein the first slurry is a sol gel comprising a metal organic salt comprising aluminum tri-sec butoxide, a first carrier fluid, ethanol, acetic acid, methanol, and a ceramic material;
    heating the composite structure to a first sol gel temperature sufficient to form a sol gel-derived base layer on the composite structure;
    forming a second slurry by combining a pre-slurry composition with a second carrier fluid, wherein the pre-slurry composition comprises a phosphate glass composition,
        wherein the phosphate glass composition comprises at least one of phosphate glass or borophosphate glass;
    applying the second slurry to the sol gel-derived base layer; and
    heating the composite structure to a sealing temperature sufficient to form a sealing layer on the sol gel-derived base layer.

2. The method of claim 1, wherein the ceramic material comprises at least one of silicon carbide nanoparticles, boron carbide particles, silicon nitride nanoparticles, titanium carbide nanoparticles, titanium boride particles, or titanium nitride nanoparticles.

3. The method of claim 1, wherein the metal organic salt comprises at least one of an aluminum compound, a silicon compound, a zirconium compound, a titanium compound, or a calcium compound.

4. The method of claim 3, wherein the metal organic salt comprises at least one of aluminum nitrate, aluminum isopropoxide, aluminum sec-butoxide, tetraethyl orthosilicate, zirconium n-propoxide, titanium isopropoxide, calcium nitrate.

5. The method of claim 1, wherein the applying the first slurry is completed by at least one of spraying or brushing the first slurry onto the surface of the composite structure.

6. The method of claim 1, wherein the first slurry is substantially free of at least one of phosphate glass or acid aluminum phosphate.

7. The method of claim 1, wherein the first slurry further comprises a pH modifier.

8. The method of claim 7, wherein the pH modifier is at least one of acetic acid, ammonium hydroxide, nitric acid, or hydrochloric acid.

9. The method of claim 1, wherein the at least one of phosphate glass or borophosphate glass is prepared by being ground to form a glass frit.

10. The method of claim 1, wherein the phosphate glass composition is free of an oxide of silicon.

11. The method of claim 1, further comprising applying a pretreating composition prior to applying the first slurry to the composite structure, wherein the applying the pretreating composition comprises:
    applying a first pretreating composition to an outer surface of the composite structure before the applying the first slurry, and the applying the second slurry, wherein the first pretreating composition comprises aluminum oxide and water;
    heating the first pretreating composition on the composite structure; and
    applying a second pretreating composition comprising at least one of a phosphoric acid or an acid phosphate salt, and an aluminum salt on the first pretreating composition, wherein the composite structure is porous and the second pretreating composition penetrates at least a portion of a plurality of pores of the composite structure.

* * * * *